United States Patent
Rastegar et al.

(10) Patent No.: US 11,394,056 B2
(45) Date of Patent: Jul. 19, 2022

(54) COMPOSITE SOLID POLYMER ELECTROLYTES FOR ENERGY STORAGE DEVICES

(71) Applicant: Solid State Battery Incorporated, Pico Riveria, CA (US)

(72) Inventors: Freidoon Rastegar, Pico Riveria, CA (US); Wei Fan Kuan, Pico Riveria, CA (US)

(73) Assignee: Solid State Battery Incorporated, Pico Riveria, CA (US)

( * ) Notice: Subject to any disclaimer, the term of this patent is extended or adjusted under 35 U.S.C. 154(b) by 0 days.

(21) Appl. No.: 16/400,482

(22) Filed: May 1, 2019

(65) Prior Publication Data

US 2019/0379085 A1 Dec. 12, 2019

Related U.S. Application Data

(60) Provisional application No. 62/682,425, filed on Jun. 8, 2018.

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0082* (2013.01)

(58) Field of Classification Search
None
See application file for complete search history.

(56) References Cited

U.S. PATENT DOCUMENTS

| | | | | |
|---|---|---|---|---|
| 5,728,489 A | * | 3/1998 | Gao | H01M 10/052 429/309 |
| 6,171,522 B1 | * | 1/2001 | Michot | B01J 31/0215 252/500 |
| 9,720,299 B1 | * | 8/2017 | Timmerman | C08G 59/223 |
| 9,742,008 B2 | | 8/2017 | Zimmerman et al. | |
| 9,925,813 B2 | | 3/2018 | Nelson et al. | |
| 10,199,657 B2 | | 2/2019 | Zimmerman et al. | |
| 2011/0003211 A1 | | 1/2011 | Hudson et al. | |
| 2013/0273436 A1 | * | 10/2013 | Shinmei | H01M 10/0565 429/313 |
| 2015/0221980 A1 | | 8/2015 | Hillmyer et al. | |

(Continued)

FOREIGN PATENT DOCUMENTS

| | | |
|---|---|---|
| WO | 01/17051 A1 | 3/2001 |
| WO | 2016/196873 A1 | 12/2016 |

OTHER PUBLICATIONS

Chen et al., "A new composite solid electrolyte PEO/Li$_{10}$GeP$_2$S$_{12}$/SN for all-solid-state lithium battery," *Electrochimica Acta* 210:905-914, 2016.

(Continued)

*Primary Examiner* — Wyatt P McConnell
(74) *Attorney, Agent, or Firm* — Ballard Spahr LLP

(57) ABSTRACT

The present application is directed to compositions and methods of preparing electrolyte materials. The electrolyte materials prepared according to compositions and methods described herein comprise enhanced electrochemical properties and find utility in any number of electrical devices, for example, in lithium batteries.

20 Claims, 5 Drawing Sheets

(56) References Cited

U.S. PATENT DOCUMENTS

| | | | |
|---|---|---|---|
| 2016/0028114 A1* | 1/2016 | Pratt | H01B 1/122 429/309 |
| 2016/0126598 A1* | 5/2016 | Lee | H01M 10/052 429/7 |
| 2016/0181626 A1* | 6/2016 | Madabusi | H01M 8/0239 429/105 |
| 2017/0018781 A1 | 1/2017 | Zimmerman | |
| 2017/0141430 A1 | 5/2017 | Balsara et al. | |
| 2017/0179545 A1 | 6/2017 | Kodama et al. | |
| 2017/0194663 A1 | 7/2017 | Zhamu et al. | |
| 2018/0145370 A1* | 5/2018 | Buisine | H01G 11/56 |

OTHER PUBLICATIONS

Croce et al., "Nanocomposite polymer electrolytes for lithium batteries," *Nature* 394:456-458, 1998.

Fergus, "Ceramic and Polymeric solid electrolytes for lithium-ion batteries," *Journal of Power Sources* 195:4554-4569, 2010.

Khurana et al., "Suppression of Lithium Dendrite Growth Using Cross-Linked Polyethylene/Poly (ethylene oxide) Electrolytes: A New Approach for Practical Lithium-Metal Polymer Batteries," *J. Am. Chem. Soc.* 136:7395-7402, 2014.

Lin et al., "Influence of $TiO_2$ nano-particles on the transport properties of composite polymer electrolyte for lithium-ion batteries," *Journal of Power Sources* 146:397-401, 2005.

Manthiram et al., "Lithium battery chemistries enabled by solid-state electrolytes," *Nature* 2(16103), 2017. (16 pages).

Panday et al., "Effect of Molecular Weight and Salt Concentration on Conductivity of Block Copolymer Electrolytes," *Macromolecules* 42:4632-4637, 2009.

Porcarelli et al., "Super Soft All-Ethylene Oxide Polymer Electrolyte for Safe All-Solid Lithium Batteries," *Scientific Reports* 6:19892, 2016. (14 pages).

Young et al., "Block Copolymer Electrolytes for Rechargeable Lithium Batteries," *Journal of Polymer Science, Part B: Polymer Physics* 52:1-16, 2014.

* cited by examiner

COMPOSITE SOLID POLYMER ELECTROLYTES FOR ENERGY STORAGE DEVICES

BACKGROUND

Technical Field

The present disclosure generally relates to a composition and methods for preparing composite solid state electrolytes, as well as methods for making devices containing the same.

DESCRIPTION OF THE RELATED ART

The demand for safe and efficient energy storage devices with high energy densities is increasing, and electrochemical devices such as rechargeable lithium batteries are promising solutions in these clean and sustainable energy storage systems. Most contemporary lithium ion batteries utilize liquid-based electrolytes. Though organic solvents offer extraordinary ionic conductivity compared to solvent-free electrolytes, organic liquid electrolytes are flammable at high temperatures which can render them thermally and electrochemically unstable. Physical or others damage to lithium ion battery packs can cause short-circuits leading to thermal runaway in flammable liquid electrolytes. These safety concerns have promoted interest in all-solid-state lithium batteries with a solvent-free electrolyte.

Solid polymer electrolytes have been suggested to be thermally and electrochemically stable compared to conventional liquid electrolytes in lithium batteries. Although the use of a solvent-free polymer electrolyte system such as poly(ethylene oxide) ("PEO") or poly(ethylene glycol) ("PEG") can provide reasonable ionic conductivities ($\sim 10^{-3}$ S/cm at 60° C.) at elevated temperature, there are two major roadblocks limiting the applications of solid polymer electrolytes.

PEO has been studied extensively as a promising candidate for polymer electrolytes due to its low glass transition temperature, which promotes ion transfer, and good ability to dissolve lithium salts. The ion transport in polymer electrolyte (i.e., lithium salt-doped polymer) is assisted by segmental motion of PEO chains in the amorphous state. However, lithium salt-doped PEO exhibits crystalline states below about 60° C., resulting in a significant drop on the ionic conductivity ($10^{-6}$-$10^{-8}$ S/cm at 30° C.).

Additionally, solid electrolyte systems suffer from dendrite formation on lithium anode surface by non-uniform electrochemical deposition of lithium during repeated charging/discharging cycles. These dendrites can span the inter-electrode space, short circuit the cell, and cause overheating and thermal runaway. Many approaches have been proposed in the literature to delay dendrite formation, including alloying lithium anodes with other metals and using additives to improve the uniformity at the solid electrolyte interface ("SEI"). Although these strategies are promising, the performance suffers due to a reduced anode capacity, and durability is lowered by consumption of additives during the formation of the SEI films over repeated charging/discharging cycles.

While significant advances have been made in the field, there continues to be a need in the art for an improved method for producing stable, highly conductive solid electrolyte materials for use in electrical energy storage devices. The present invention fulfills these needs and provides further related advantages.

BRIEF SUMMARY

Applicants have discovered a synergistic effect of electrolyte materials comprising a cross-linked polymer, lithium salt, plasticizer, and filler material. Increases in performance result in part from improved polymer chain mobility, polymer recrystallization kinetics, and increased mechanical strength. Embodiments of the electrolyte materials provide increased mechanical strength that enables improvement of battery cycle-life relative to conventional polymer electrolytes.

Accordingly, one embodiment provides a solid electrolyte material comprising a cross-linked polymer compound, a lithium salt dispersed within the polymer compound, a plasticizer, and a filler material. Another embodiment provides a solid electrolyte material comprising a polymer compound, a lithium salt dispersed within the polymer compound, a plasticizer, a filler material, and a cross-linking initiator.

Another embodiment provides an electrochemical cell comprising:
 (a) a solid electrolyte material according to the foregoing embodiments;
 (b) a cathode; and
 (c) an anode.

Yet another embodiment provides a method for storing or distributing electrochemical energy, the method comprising:
 (a) providing a device comprising the electrochemical cell according to the foregoing embodiment;
 (b) applying a voltage to the electrochemical cell; and
 (c) flowing ions through the electrolyte material of the electrochemical cell.

An additional embodiment provides a method for preparing a solid electrolyte material, the method comprising mixing a polymer compound, a lithium salt, a plasticizer, a filler material, and a cross-linking initiator to obtain a mixture, wherein the lithium salt is dispersed within the polymer compound and initiating a cross linking reaction with the cross-linking initiator, thereby converting the polymer compound to a solid, cross-linked polymer compound.

These and other aspects of the invention will be apparent upon reference to the following detailed description.

BRIEF DESCRIPTION OF THE DRAWINGS

In the figures, identical reference numbers identify similar elements. The sizes and relative positions of elements in the figures are not necessarily drawn to scale and some of these elements are enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Figure 1:
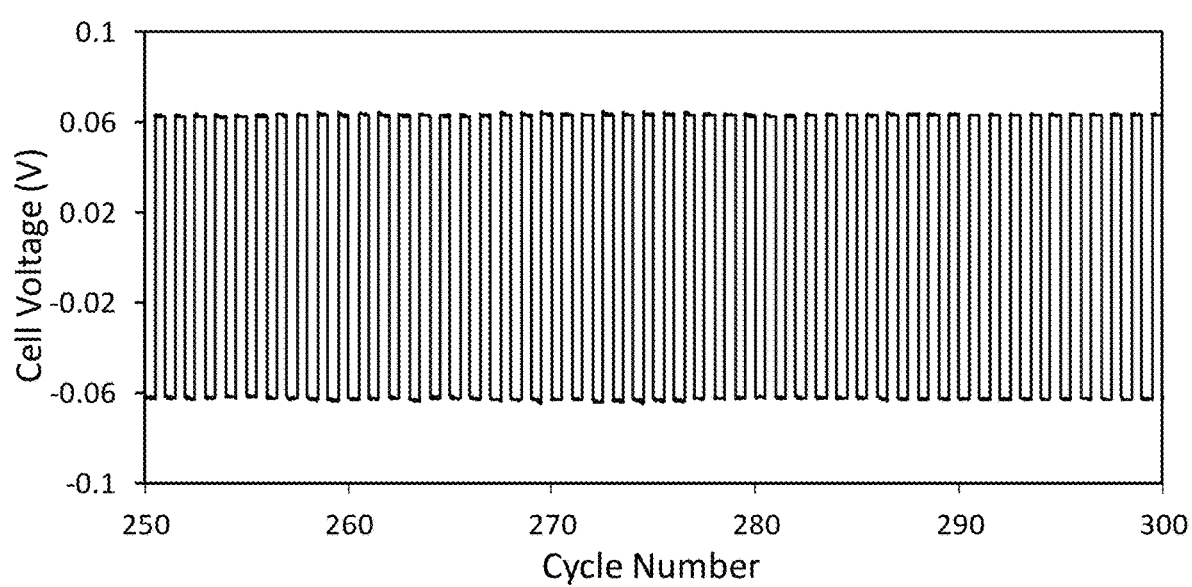
FIG. 1 shows cycle-life data for a symmetric lithium battery cell with an electrolyte material having a cross-linked polymer, lithium salt, plasticizer, and filler material.

In general terms, the current disclosure is directed to novel composite solid polymer electrolytes (i.e., separator)

for all-solid-state lithium batteries. The solid electrolyte composite materials provide superior durability while maintaining outstanding electrochemical performance (e.g., ion conductivity). Specifically, embodiments of the present compositions exhibit unique advantages such as having an ionic conductivity above about $10^{-3}$ S/cm at room temperature. The solid electrolytes of the present disclosure can be used to provide stable, cost effective, and highly efficient all solid-state lithium batteries. The electrolyte material prepared according to compositions and methods described herein have enhanced electrochemical properties and find utility in any number of electrical storage devices (e.g., lithium batteries or capacitors).

Currently known solid electrolytes have had some success in addressing the lithium metal dendrite and flammability issues, conventional solid-state electrolytes have major deficiencies, including: high cost, low lithium ion conductivities (typically <<$10^{-4}$ S/cm, and mostly <<$10^{-5}$ S/cm), difficulty in making solid-state electrolyte (e.g., high temperature sintering typically required) and implementing it in a battery cell, brittleness/no flexibility (i.e., having poor electrode/electrolyte contact and, in turn, low efficiency).

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Definitions

As used herein, and unless the context dictates otherwise, the following terms have the meanings as specified below.

"Crystalline" refers to a material whose constituent atoms, molecules, or ions are arranged in an orderly repeating pattern.

"Polymer" refers to a macromolecule comprising two or more structural repeating units. Polymers of the present disclosure include, but are not limited to polymers comprising poly(ethylene oxide) (e.g., PEG and PEO), poly(methyl methacrylate), poly(ethylene oxide) methylether methacrylate, poly(acetyl-oligo(ethylene oxide) acrylate), poly(ethylene glycol) dimethacrylate, poly(ethylene glycol) methacrylate, poly(acrylonitrile), poly(vinyl chloride), poly(styrene-b-ethlyeneoxide), poly(styrene-b-ethylene oxide)methyl ether metacrylate, poly(styrene-b-methyl methacrylate), poly(ethylene-b-ethylene oxide) and the like. Polymers may include only one type of structural repeat unit (i.e., a homopolymer) or a mixture of different repeat units (i.e., a heteropolymer, co-polymer).

"Alkylene" or "alkylene chain" refers to a straight or branched hydrocarbon chain linking the rest of the molecule to a radical group, consisting solely of carbon and hydrogen, containing no unsaturation. The alkylene chain is attached to the rest of the molecule through a single bond and to the radical group through a single bond. The points of attachment of the alkylene chain to the rest of the molecule and to the radical group can be through one carbon or any two carbons within the chain. Unless stated otherwise specifically in the specification, alkylene is optionally substituted.

"Alkylene oxide" refers to a straight or branched molecule consisting of carbon, hydrogen and oxygen and containing at least one carbon-oxygen-carbon linkage and may contain more than one carbon-oxygen-carbon linkage. For example, ethylene oxide and polyethylene oxide (PEO) are included within the meaning of alkylene oxide. Unless stated otherwise specifically in the specification, an alkylene oxide group is optionally substituted.

"Monomer" refers to compounds used in the preparation of a polymer and also the structural repeat units thereof. Structural repeating units include, but are not limited to alkylene oxide, methyl methacrylate, acrylonitrile, vinyl chloride, styrene, or ethylene monomer units.

"Solvent" refers to a substance which dissolves or suspends reactants and provides a medium in which a reaction may occur. Examples of solvents include, but are not limited to, water, alcohols and mixtures thereof. Exemplary alcohols include ethanol, t-butanol, methanol and mixtures thereof "Electrode" refers to the positive or negative component of a cell (e.g., capacitor, battery, etc.) including the electrolyte material. Electrodes generally comprise one or more metal leads through which electricity enters or leaves the electrode.

"Inert" refers to a material that is not active in the electrolyte of an electrical energy storage device, that is it does not absorb a significant amount of ions or change chemically, e.g., degrade.

"Conductive" refers to the ability of a material to conduct electrons through transmission of loosely held valence electrons.

"Current collector" refers to a part of an electrical energy storage and/or distribution device which provides an electrical connection to facilitate the flow of electricity in to, or out of, the device. Current collectors often comprise metal and/or other conductive materials and may be used as a backing for electrodes to facilitate the flow of electricity to and from the electrode.

"Cross-linked" or any grammatical equivalent refers to one or more covalent linkages between polymer molecules or parts of a single polymer molecule. For example, in some embodiments, two substantially linear polymer molecules attached at a point that is substantially in the middle of the polymer molecule.

Figure 5:
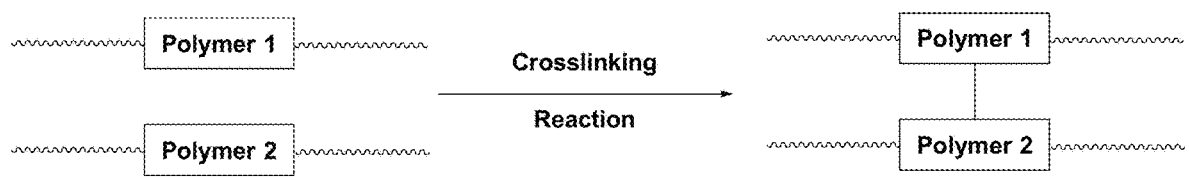
FIG. 5 depicts an exemplary cross-linking reaction that forms a covalent bond between two polymer molecules.

As used herein, a "cross-linked polymer compound" refers to a substance comprising polymer molecules wherein at least a portion of the polymer molecules have formed intramolecular (i.e., a between two parts of the same polymer molecule) or intermolecular (i.e., between two different polymer molecules) covalent linkages. Cross-linking includes forming covalent bonds directly between polymer molecules or parts of a single polymer molecule as well as forming one or more linkages using an additional molecular agent (i.e., a cross-linking agent). FIG. 5 shows an illustrative example of two polymer molecules forming a cross-linked structure.

"Cross-linking density" refers to a ratio of cross-links (i.e., covalent linkages) formed in a population a plurality of polymer molecules. A polymer compound having a higher cross-linking density has more cross-links than a polymer compound having a low cross-linking density when molecular weight is held constant. As used herein, the cross-linking density is expressed according to the following equation:

$$CD_p = \frac{N_p}{MW_p} \times 100$$

wherein:

$CD_p$ is the cross-linking density of a polymer compound, $N_p$ is the number of cross-links present on the polymer compound and $MW_p$ is the molecular weight of the polymer compound. For example, a cross-linking reagent having two cross-links and a molecular weight of 1,000 g/mol would have a cross-linking density of 0.20.

"Cross-linking initiator" refers to an agent or substance that is reactive chemically when stimulated (e.g., with ultra-violet light, heat, microwave radiation, electromagnetic radiation, and the like) and causes a chemical reaction between two chemical moieties (e.g., between two parts of a polymer molecule or between two different polymer molecules) that forms a covalent bond (i.e., a cross-link) between the two chemical moieties. In certain embodiments, the chemical reaction comprises a free radical process (e.g., free radical generation on an oxygen species such as PEG or PEO).

"Electrolyte" means a substance containing free ions (e.g., lithium ions) such that the substance is ionic-conductive. Electrolytes are commonly employed in electrical energy storage devices.

"Solid" or "solid electrolyte material" refers to a substance that is substantially free of liquid or solvent that has sufficient mechanical integrity such that the substance substantially maintains its form without being attached to any support. In certain embodiments, the solid is flexible and moldable but can be handled and processed without being attached to a substrate for support. The form of the solid electrolyte material is not particularly limited. For example, in some embodiments, the solid electrolyte material is in the form of a film, for example, a film coating a substrate (e.g., a metal currently collector).

In some embodiments, the film is reticulated, i.e., a layer or film that includes open spaces or discontinuities, yet still forms a connected network capable of conductivity. Examples of reticulated material include, but are not limited to, nets, meshes, screens, perforated films, plates and foams.

"Lithium sulfide-based filler material" refers to filler material comprising lithium sulfide. Lithium sulfide-based filler material may further comprise other species, for example, silicon, tin, germanium or phosphorus.

"Lithium oxide-based particles" refers to a particulate substance comprising lithium oxide. Lithium oxide-based particles may further comprise other species, for example, lanthanum, titanium, oxygen, niobium, tantalum, calcium, strontium, barium, indium, zirconium or tellurium.

"Lithium phosphate-based particles" refers to a particulate substance comprising lithium phosphate. Lithium phosphate-based particles may further comprise other species, such as, aluminum, germanium, phosphorus, oxygen, titanium, chromium, gallium, iron, scandium, indium, lutetium, yttrium, or lanthanum.

Solid Electrolyte Material

One embodiment provides a solid electrolyte material comprising a cross-linked polymer compound, a lithium salt dispersed within the polymer compound, a plasticizer, and a filler material. A related embodiment provides a solid electrolyte material comprising a polymer compound, a lithium salt dispersed within the polymer compound, a plasticizer, a filler material, and a cross-linking initiator. Typically the cross-linking initiator is present to initiate a free-radical process that results in forming cross-links in the polymer compound (e.g., inter- or intramolecular cross-links of polymer molecules).

The ionic conductivity of the solid electrolyte material according to the present disclosure significantly improved relative to conventional polymer electrolytes and similar to liquid electrolytes. Ionic conductivity can be measured using methods known in the art and as described in detail according to the present disclosure (e.g., Example 5).

Accordingly, in some embodiments, the solid electrolyte material has an ionic conductivity above about $10^{-3}$ S/cm at room temperature. In some more specific embodiments, the solid electrolyte material has an ionic conductivity ranging about $10^{-5}$ S/cm to about $10^{-2}$ S/cm, from about $5 \times 10^{-5}$ S/cm to about $5 \times 10^{-2}$ S/cm, from about $5 \times 10^{-5}$ S/cm to about $10^{-3}$ S/cm, from about $10^{-4}$ S/cm to about $10^{-2}$ S/cm, from about $5 \times 10^{-4}$ S/cm to about $10^{-2}$ S/cm, from about $10^{-3}$ S/cm to about $5 \times 10^{-2}$ S/cm, from about $7.5 \times 10^{-5}$ S/cm to about $10^{-2}$ S/cm, from about $7.5 \times 10^{-4}$ S/cm to about $10^{-2}$ S/cm, from about $5 \times 10^{-5}$ S/cm to about $5 \times 10^{-3}$ S/cm, from about $7.5 \times 10^{-5}$ S/cm to about $5 \times 10^{-3}$ S/cm, from about $5 \times 10^{-4}$ S/cm to about $5 \times 10^{-3}$ S/cm, from about $5 \times 10^{-4}$ S/cm to about $5 \times 10^{-2}$ S/cm or from about $7.5 \times 10^{-4}$ S/cm to about $5 \times 10^{-2}$ S/cm.

In the some of the foregoing embodiments, the solid electrolyte material has an ionic conductivity as measured at an operating temperature. In certain embodiments, the operating temperature is above about 50° C. In some embodiments, the operating temperature is above about 5° C., about 10° C., about 15° C., about 20° C., about 25° C., about 30° C., about 35° C., about 40° C., about 45° C., about 50° C., about 55° C. or about 60° C. In some embodiments, the operating temperature ranges from about 10° C. to about 120° C. In some embodiments, the operating temperature ranges from about 15° C. to about 100° C., about 15° C. to about 90° C., about 20° C. to about 60° C., about 20° C. to about 50° C., about 20° C. to about 35° C., about 5° C. to about 35° C., about 5° C. to about 25° C., about 15° C. to about 30° C., about 20° C. to about 30° C., about 20° C. to about 35° C.

The compositions described herein are ionically conductive, yet maintain robust mechanical strength. In certain embodiments, the solid electrolyte material has a modulus greater than about $1 \times 10^5$ Pa at an operating temperature. In some embodiments, the solid electrolyte material has a modulus greater than about $1 \times 10^6$ Pa at an operating temperature. In some embodiments, the solid electrolyte material has a modulus greater than about $1 \times 10^7$ Pa at an operating temperature. In some embodiments, the solid electrolyte material has a modulus ranging from about $1 \times 10^4$ Pa to about $1 \times 10^9$ Pa, from about $1 \times 10^4$ Pa to about $1 \times 10^8$ Pa, from about $5 \times 10^4$ Pa to about $1 \times 10^9$ Pa, from about $7.5 \times 10^4$ Pa to about $1 \times 10^9$ Pa, from about $5 \times 10^5$ Pa to about $1 \times 10^9$ Pa, from about $7.5 \times 10^5$ Pa to about $1 \times 10^9$ Pa, from about $5 \times 10^6$ Pa to about $1 \times 10^9$ Pa or from about $7.5 \times 10^6$ Pa to about $1\times10^9$ Pa at an operating temperature. Modulus refers to the ratio of stress (i.e., force per unit area) to strain. Techniques for measuring modulus would be readily apparent to one of ordinary skill in the art, including a tension (or compression) test, a bending test, and a natural frequency vibration test.

Without wishing to be bound by theory, Applicant believes ion mobility is affected at least in part by the polymer compound and its ability to coordinate via charge interactions with an ionic species. Advantageously, Applicant has discovered a composition that provides a solid electrolyte composition comprising a polymer compound has a substantially amorphous (i.e., low degree of crystallinity) structure, especially under operating conditions, that is conducive to ion transport yet maintains mechanical strength.

That is, the solid electrolyte material of the present disclosure provides a low degree of crystallinity, a low glass transition temperature ($T_g$), and increases polymer chain mobility while surprisingly maintaining a high degree of mechanical strength and resistance to degradation.

The degree of crystallinity can be measured using a variety of techniques known in the art, including density measurements, calorimetry (e.g., differential scanning calorimetry or DSC), x-ray diffraction, infrared spectroscopy and nuclear magnetic resonance (NMR) spectroscopy. Accordingly, in some embodiments, the polymer compound has a low degree of crystallinity as determined by differential scanning calorimetry (DSC).

In other embodiments, the solid electrolyte material has a low degree of crystallinity as measured by x-ray diffraction. In some embodiments the low degree of crystallinity is less than about 90%, less than about 85%, less than about 80%, less than about 75%, less than about 70%, less than about 65%, less than about 60%, less than about 55%, less than about 50%, less than about 45%, less than about 40%, less than about 35%, less than about 30%, less than about 25%, less than about 20%, less than about 15% or less than about 10%.

In some embodiments, the solid electrolyte material has an ionic conductivity above about $10^{-3}$ S/cm and the degree of crystallinity is less than about 90%. In some more specific embodiments, the solid electrolyte material has an ionic conductivity ranging about $10^{-5}$ S/cm to about $10^{-2}$ S/cm and the degree of crystallinity is less than about 70%. In some more specific embodiments, the solid electrolyte material has an ionic conductivity ranging about $10^{-4}$ S/cm to about $10^{-2}$ S/cm and the degree of crystallinity is less than about 70%. In some more specific embodiments, the solid electrolyte material has an ionic conductivity ranging about $10^{-4}$ S/cm to about $10^{-2}$ S/cm and the degree of crystallinity is less than about 60%. In some more specific embodiments, the solid electrolyte material has an ionic conductivity ranging about $5\times10^{-4}$ S/cm to about $10^{-2}$ S/cm and the degree of crystallinity is less than about 80%. In some more specific embodiments, the solid electrolyte material has an ionic conductivity ranging about $5\times10^{-4}$ S/cm to about $10^{-2}$ S/cm and the degree of crystallinity is less than about 70%. In some more specific embodiments, the solid electrolyte material has an ionic conductivity ranging about $7.5\times10^{-4}$ S/cm to about $10^{-2}$ S/cm and the degree of crystallinity is less than about 80%. In some more specific embodiments, the solid electrolyte material has an ionic conductivity ranging about $7.5\times10^{-4}$ S/cm to about $10^{-2}$ S/cm and the degree of crystallinity is less than about 70%. In some more specific embodiments, the solid electrolyte material has an ionic conductivity ranging about $7.5\times10^{-4}$ S/cm to about $10^{-2}$ S/cm and the degree of crystallinity is less than about 60%.

In certain specific embodiments, the solid electrolyte material has a low degree of crystallinity and/or ionic conductivity at an operating temperature. In certain embodiments, the operating temperature is above about 50° C. In some embodiments, the operating temperature is above about 5° C., about 10° C., about 15° C., about 20° C., about 25° C., about 30° C., about 35° C., about 40° C., about 45° C., about 50° C., about 55° C. or about 60° C.

In some embodiments, the operating temperature ranges from about 10° C. to about 120° C. In some embodiments, the operating temperature ranges from about 15° C. to about 100° C., about 15° C. to about 90° C., about 20° C. to about 60° C., about 20° C. to about 50° C., about 20° C. to about 35° C., about 5° C. to about 35° C., about 5° C. to about 25° C., about 15° C. to about 30° C., about 20° C. to about 30° C., about 20° C. to about 35° C. In certain embodiments the glass transition temperature of the solid electrolyte material is lower than the operating temperature.

1. Polymer Compound

The polymer compound of the present disclosure can be selected based on the desired characteristics of the final electrolyte composition. For example, the polymer compound can be selected so the solid electrolyte material has a sufficiently solid and amorphous structure and improved ion mobility relative to other solid electrolyte compositions. In particular, the polymer composition can be selected in combination with the other components detailed herein, so the solid electrolyte composition has a low degree of crystallinity.

The relative amount of the polymer compound is one factor that can affect the overall performance characteristics of the composition. Accordingly, in some embodiments, the concentration of the polymer compound ranges from about 10 wt % to 60 wt % of the electrolyte material. In some embodiments, the concentration of the polymer compound ranges from about 15 wt % to 55 wt % of the electrolyte material. In some more specific embodiments, the concentration of the polymer compound ranges from about 20 wt % to 50 wt % of the electrolyte material. In certain embodiments, the concentration of the polymer compound ranges from greater than 0 wt % to less than 100 wt %, from about 1 wt % to about 99 wt %, from about 5 wt % to about 90 wt %, from about 10 wt % to about 80 wt %, from about 20 wt % to about 70 wt %, from about 25 wt % to about 65 wt %, from about 20 wt % to about 60 wt %, from about 25 wt % to about 55 wt %, from about 30 wt % to about 70 wt %, from about 35 wt % to about 70 wt %, from about 35 wt % to about 80 wt %, from about 25 wt % to about 45 wt %, from about 25 wt % to about 35 wt %, from about 20 wt % to about 30 wt %, from about 10 wt % to about 50 wt %, from about 10 wt % to about 40 wt %, from about 10 wt % to about 30 wt %, or from about 20 wt % to about 99 wt %.

In some embodiments, the polymer compound has a cross-link density greater than about 0.001. In some embodiments, the polymer compound has a cross-link density greater than about 0.005, greater than about 0.010, greater than about 0.015, greater than about 0.020, greater than about 0.025, greater than about 0.030, greater than about 0.035, greater than about 0.040, greater than about 0.045, greater than about 0.050, greater than about 0.055, greater than about 0.060, greater than about 0.065, greater than about 0.070, greater than about 0.075, greater than about 0.080, greater than about 0.085, greater than about 0.090, greater than about 0.095, greater than about 0.10, greater than about 0.20, greater than about 0.30, greater than about 0.40, greater than about 0.50, greater than about 0.60, greater than about 0.70, greater than about 0.80, greater than about 0.90, greater than about 1.00, or greater than about 1.50.

In some embodiments, the polymer compound has a cross-link density ranging from about 0.001 to about 10. In some more specific embodiments, the cross-link density ranges from about 0.05 to about 15, from about 0.05 to about 10, from about 0.05 to about 7.5, from about 0.05 to about 5, from about 0.05 to about 2.5, from about 0.05 to about 2.0, from about 0.05 to about 1.5, from about 0.05 to about 1.0, from about 0.05 to about 0.5, from about 0.5 to about 15, from about 0.75 to about 15, from about 1.0 to about 15, from about 1.25 to about 15, from about 1.5 to about 15, from about 1.75 to about 15, from about 2.0 to about 15, from about 2.25 to about 15, from about 2.50 to about 15, from about 2.75 to about 15, from about 3.0 to about 15, from about 3.25 to about 15, from about 3.50 to about 15, from about 3.75 to about 15, or from about 4.0 to about 15.

In some embodiments, the polymer compound is a homopolymer. In some embodiments, the polymer compound comprises a plurality of polymers (e.g., homopolymers or heteropolymers). In certain embodiments, the polymer compound comprises a plurality of polymer compounds having different molecular weights (i.e., the polymer compound comprises a distribution of molecular weights). For a polymer compound having a distribution of molecular weights, the molecular weight of the polymer compound is the average molecular weight of the distribution.

In certain embodiments, the polymer compound has a molecular weight ranging from about 100 g/mol to about 10,000,000 g/mol. In certain more specific embodiments, the molecular weight ranges from about 500 g/mol to about 1,000,000 g/mol, from about 500 g/mol to about 500,000 g/mol, from about 1,000 g/mol to about 1,000,000 g/mol, from about 500 g/mol to about 100,000 g/mol, from about 1,000 g/mol to about 100,000 g/mol, from about 500 g/mol to about 10,000 g/mol, from about 1,000 g/mol to about 10,000 g/mol, from about 10,000 g/mol to about 1,000,000 g/mol, from about 100 g/mol to about 10,000 g/mol, from about 50 g/mol to about 10,000,000 g/mol, from about 15,000 g/mol to about 1,000,000 g/mol, from about 5,000 g/mol to about 1,000,000 g/mol, from about 5,000 g/mol to about 100,000 g/mol, from about 2,500 g/mol to about 1,000,000 g/mol or from about 100 g/mol to about 2,500 g/mol.

In some embodiments the polymer is a block co-polymer. In some embodiments, the polymer compound is a homopolymer. In certain embodiments, the polymer compound is a linear polymer including polyethers, polyamines, polyimides, polyamides, alkyl carbonates, polynitriles, and combinations thereof. Linear polymers can also be used in combination with polysiloxanes, polyphosphazines, polyolefins, and/or polydienes to form the conductive phase.

In certain embodiments, the polymer compound comprises alkylene oxide, methyl methacrylate, acrylonitrile, vinyl chloride, styrene, or ethylene monomer units. In certain embodiments, the polymer compound comprises derivatized (e.g., halogenated, alkylated, oxidized, and the like) alkylene oxide, methyl methacrylate, acrylonitrile, vinyl chloride, styrene, or ethylene monomer units. In certain specific embodiments, the polymer compound comprises alkylene oxide. For example, in some embodiments, the alkylene oxide is ethylene oxide (e.g., polyethylene oxide).

In more specific embodiments, the polymer compound comprises poly(ethylene oxide), poly(propylene oxide), poly(methyl methacrylate), poly(vinylidene fluoride), poly(ethylene oxide)methylether methacrylate, poly(acetyl-oligo(ethylene oxide) acrylate), poly(ethylene glycol)dimethacrylate, poly(ethylene glycol) methacrylate, poly(acrylonitrile), poly(vinyl chloride), poly(styrene-b-ethlyeneoxide), poly(styrene-b-ethylene oxide)methyl ether metacrylate, poly(styrene-b-methyl methacrylate), poly(ethylene-b-ethylene oxide), or combinations thereof.

In some related embodiments, the polymer compound is selected from the group consisting of poly(ethylene oxide), poly(propylene oxide), poly(acrylonitrile), poly(methyl methacrylate), poly(vinylidene fluoride), poly b-methoxy ethoxyethoxide-phosphazenes, polyvinyl chloride, polydimethylsiloxane, and poly(vinylidene fluoride)-hexafluoropropylene or combinations thereof.

In some embodiments, polymer compound comprises a polyethylene derivative, a polyethylene oxide derivative, a polypropylene oxide derivative, a phosphate ester polymer, polyester sulfide, polyvinyl alcohol, polyvinylidene fluoride, or a polymer including an ionic dissociative group.

In another embodiment, the polymer compound is made of comb polymers that have a backbone and pendant groups. Backbones that can be used in these polymers include, but are not limited to, polysiloxanes, polyphosphazines, polyethers, polydienes, polyolefins, polyacrylates, polymethacrylates, and combinations thereof. Pendants that can be used include, but are not limited to, oligoethers, substituted oligoethers, ethylene carbonate, nitrile groups, sulfones, alkylene oxides, substituted alkylene oxides, oligoethers, thiols, polyethers, polyamines, polyimides, polyamides, alkyl carbonates, polynitriles, other polar groups, and combinations thereof.

In some embodiments, the solid electrolyte material further comprises an additional polymer compound selected from the group consisting of poly(ethylene oxide), poly(methyl methacrylate), poly(ethylene oxide)methylether methacrylate, poly(acetyl-oligo(ethylene oxide) acrylate), poly(ethylene glycol)dimethacrylate, poly(ethylene glycol) methacrylate, poly(acrylonitrile), poly(vinyl chloride), poly(styrene-b-ethylene oxide), poly(styrene-b-ethylene oxide) methyl ether metacrylate, poly(styrene-b-methyl methacrylate), poly(ethylene-b-ethylene oxide), or combinations thereof 2. Lithium Salt Many attempts have been made to address the dendrite and thermal runaway issues. However, despite these earlier efforts, no rechargeable Li metal batteries have succeeded in the market place. This is likely due to the notion that these prior art approaches still have major deficiencies. For instance, in several cases, the anode or electrolyte structures designed for prevention of dendrites are too complex. In others, the materials are too costly or the processes for making these materials are too laborious or difficult.

The type of lithium salt is not particularly limited and can be selected such that performance characteristics (e.g., durability, ion conductivity) of the electrolyte material are optimal. Accordingly, in certain embodiments, the lithium salt is lithium bistrifluoromethane sulfonamide, lithium perchlorate, lithium trifluoromethanesulfonate, or a combination thereof.

In certain embodiments, the lithium salt comprises $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or combinations thereof, wherein X=F, Cl, I, or Br, R=alkyl, x=0-1, and y=1-4. In more specific embodiments, the lithium salt comprises lithium perchlorate ($LiClO_4$), lithium hexafluorophosphate ($LiPF_6$), lithium tetrafluoroborate ($LiBF_4$)

lithium hexafluoroarsenide ($LiAsF_6$), bis-trifluoromethyl sulfonylimide lithium ($LiN(CF_3SO_2)_2$), lithium bis(oxalato) borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethysulfonylimide (Li-BETI), lithium bis(trifluoromethanesulphonyl)imide, lithium bis(fluorosulphonyl)imide, an ionic liquid-based lithium salt, or a combination thereof. In some embodiments, the lithium salt comprises LiSCN, $LiN(CN)_2$, $Li(CF_3SO_2)_3C$, $LiSbF_6$, $LiN(SO_2CF_3)_2$, $Li(FSO_2)_2N$, $LiC_4F_9SO_3$, $LiN(SO_2CF_2CF_3)_2$, $LiSbF_6$, $LiPF_3(C_2F_5)_3$, $LiPF_3(CF_3)_3$, $LiB(C_2O_4)_2$, lithium difluoro(oxalato)borate (LiFOB), and mixtures thereof.

The relative amount of the lithium salt can also affect the overall performance characteristics of the composition. Accordingly, in some embodiments, the concentration of the lithium salt ranges from about 0.25 wt % to about 50 wt % of the electrolyte material. In some embodiments, the concentration of the lithium salt ranges from about 0.5 wt % to about 45 wt % of the electrolyte material. In some more specific embodiments, the concentration of the lithium salt ranges from about 1 wt % to about 40 wt % of the electrolyte material. In certain embodiments, the concentration of the lithium salt ranges from greater than 0 wt % to less than 100 wt %, from about 0.01 wt % to about 75 wt %, from about 0.5 wt % to about 70 wt %, from about 0.75 wt % to about 70 wt %, from about 1 wt % to about 70 wt %, from about 1 wt % to about 65 wt %, from about 1 wt % to about 60 wt %, from about 1 wt % to about 55 wt %, from about 0.1 wt % to about 40 wt %, from about 0.1 wt % to about 30 wt %, from about 0.1 wt % to about 20 wt %, from about 0.1 wt % to about 30 wt %, from about 0.1 wt % to about 25 wt %, from about 0.5 wt % to about 25 wt %, from about 0.5 wt % to about 20 wt %, from about 0.5 wt % to about 10 wt %, from about 0.5 wt % to about 5 wt %, or from about 20 wt % to about 40 wt %.

3. Plasticizer

While plasticizers may help address the problem of low ionic conductivity in polymer electrolytes, plasticizers necessarily introduce additional components that may have harmful effects on other electrolyte properties (e.g., stability). Like liquid organic electrolytes, plasticized polymer electrolyte is not thermodynamically stable at the lithium metal potential. In addition, previously known polymer electrolytes were unable to be manufactured as a very thin film to reduce resistance because the polymer did not have the sufficient strength to hold the liquid organic solvents in its matrix. Functional solid electrolyte required a thick film, which increased cell resistance and reduced energy density. Additionally, polymers containing liquids (e.g., polymer matrices) cannot be wound along with the rest of the electrode components in a winding machine, due to oozing of liquids as mechanical stress is applied to the polymer matrix.

Applicant has surprisingly discovered that embodiments of the present disclosure are able to overcome the limitations of previously known compositions comprising a plasticizer. That is, compositions and devices of the present disclosure may comprise a plasticizer that functions to increase segmental flexibility of a polymer compound (i.e., hinder polymer crystallization), but does not have a significant deleterious effect on solid electrolyte stability. The advantageous effect of increasing segmental flexibility while conserving stability is observed even at low temperature ranges and when solid electrolyte compositions are formed into thin layers.

Selection of the plasticizer plays an important role in the final properties of compositions and devices described herein, in certain embodiments, the plasticizer comprises succinonitrile, tetraethylene glycol dimethylether (TEGDME), polysquarate, ethylene carbonate, ethylene glycol, polysorbate 80, or a combination thereof. In some embodiments, the plasticizer is selected from the group consisting of the plasticizer comprises succinonitrile, tetraethylene glycol dimethylether, polysquarate, ethylene carbonate, ethylene glycol, and polysorbate 80. In some embodiments, the plasticizer comprises a plurality components selected from the group consisting of succinonitrile, tetraethylene glycol dimethylether, polysquarate, ethylene carbonate, ethylene glycol, and polysorbate 80.

In more specific embodiments, the plasticizer comprises ethylene carbonate. In some specific embodiments, the plasticizer comprises TEGDME. In more specific embodiments, the plasticizer is ethylene carbonate. In some specific embodiments, the plasticizer is TEGDME.

Additionally, the concentration of the plasticizer affects the overall properties of the compositions of the present disclosure. In some embodiments, the concentration of the plasticizer ranges from about 10 wt % to about 60 wt % of the electrolyte material. In some more specific embodiments, the concentration of the plasticizer ranges from about 15 wt % to about 55 wt % of the electrolyte material. In specific embodiments, the concentration of the plasticizer ranges from about 20 wt % to about 50 wt % of the electrolyte material. In certain embodiments, the concentration of the plasticizer ranges from about 10 wt % to about 60 wt % of the electrolyte material.

In some embodiments, the concentration of the plasticizer is greater than about 0 wt % of the electrolyte material. In some embodiments, the concentration of the plasticizer is less than about 100 wt % of the electrolyte material. In certain embodiments, the concentration of the plasticizer ranges from about 10 wt % to about 90 wt %, from about 15 wt % to about 85 wt %, from about 15 wt % to about 80 wt %, from about 15 wt % to about 75 wt %, from about 15 wt % to about 65 wt %, from about 15 wt % to about 60 wt %, from about 15 wt % to about 55 wt %, from about 15 wt % to about 45 wt %, from about 15 wt % to about 40 wt %, from about 15 wt % to about 35 wt %, from about 15 wt % to about 30 wt %, from about 15 wt % to about 25 wt %, from about 15 wt % to about 20 wt %, from about 20 wt % to about 90 wt %, from about 25 wt % to about 90 wt %, from about 30 wt % to about 90 wt %, from about 35 wt % to about 90 wt %, from about 40 wt % to about 90 wt %, from about 45 wt % to about 90 wt %, from about 50 wt % to about 90 wt %, from about 55 wt % to about 90 wt %, from about 60 wt % to about 90 wt %, from about 65 wt % to about 90 wt %, from about 70 wt % to about 90 wt %, from about 75 wt % to about 90 wt %, or from about 80 wt % to about 90 wt % of the electrolyte material.

4. Filler Material

Filler material has also been used to increase the ionic conductivity and mechanical property of solid electrolyte compositions. However, none of the previous approaches toward improving polymer conductivity have resulted in adequate conductivity enhancements of solid electrolyte compositions that permit room temperature operation while other essential performance characteristics are maintained.

The shape and composition of the filler material can be selected to further enhance or improve the properties of the electrolyte material based on the needs of a particular application (e.g., in a rechargeable battery). In certain embodiments, the filler material is selected from nano-discs, nano-platelets, or nano-sheets.

Additionally, filler material may comprise inorganic components, organic components, or combinations thereof. In some embodiments, the filler material is inorganic. In some other embodiments, the filler material is organic. In other embodiments, the filler material comprises inorganic components. In other embodiments, the filler material comprises organic components. In certain specific embodiments, the filler material comprises inorganic components and inorganic components.

In some embodiments, the filler material comprises bismuth selenide, bismuth telluride or a transition metal dichalcogenide or trichalcogenide. In some embodiments, the filler material comprises a sulfide, a selenide, or telluride of niobium, zirconium, molybdenum, hafnium, tantalum, tungsten, titanium, cobalt, manganese, iron, nickel, or other transition metal. In some embodiments, the filler material comprises boron nitride. In some embodiments, the filler material comprises a combination of any of the foregoing embodiments.

The size and surface area is another parameter that can be selected to optimize performance of the electrolyte material. Filler material particle size can be measured by techniques known in the art, for example, using photon correlation spectroscopy (PCS), an X-ray disc centrifuge (XDC), X-ray powder diffraction (XRD) and high resolution scanning and transmission electron microscopy. Surface area can also be measured by techniques known in the art, including gas adsorption (e.g., $N_2$ sorption at 17 K) or BET surface area measurements.

For example, in some embodiments, particles of the filler material have an average particle size less than about 150 nm. In some embodiments, particles of the filler material have an average particle size less than about 100 nm. In some more specific embodiments, particles of the filler material have an average particle size less than about 50 nm. In some embodiments, particles of the filler material have an average particle size less than about 200 nm, less than about 190 nm, less than about 180 nm, less than about 170 nm, less than about 160 nm, less than about 150 nm, less than about 140 nm, less than about 130 nm, less than about 120 nm, less than about 110 nm, less than about 100 nm, less than about 90 nm, less than about 80 nm, less than about 70 nm, less than about 60 nm, less than about 50 nm, less than about 40 nm, less than about 30 nm, less than about 10 nm, less than about 7 nm, less than about 5 nm, or less than about 2 nm.

In certain related embodiments, the filler material has a surface area ranging from about 20 to about 200 $m^2/g$. In some embodiments, the filler material has a surface area ranging from about 30 to about 200 $m^2/g$, from about 40 to about 200 $m^2/g$, from about 50 to about 200 $m^2/g$, from about 60 to about 200 $m^2/g$, from about 70 to about 200 $m^2/g$, from about 80 to about 200 $m^2/g$, from about 90 to about 200 $m^2/g$, from about 70 to about 150 $m^2/g$, from about 70 to about 140 $m^2/g$, from about 70 to about 130 $m^2/g$, from about 70 to about 120 $m^2/g$, from about 70 to about 110 $m^2/g$, from about 80 to about 110 $m^2/g$, or from about 90 to about 110 $m^2/g$.

The selection of the filler material is not particularly limited and can be modified based on the needs of particular applications (e.g., thermal stability, resistance to degradation upon recharging, increasing conductivity). Accordingly, in some embodiments, the filler material comprises non-conductive particles. In more specific embodiments, the non-conductive particles comprise titanium dioxide ($TiO_2$), silicon dioxide ($SiO_2$), zirconium dioxide ($ZrO_2$), aluminum oxide ($Al_2O_3$), indium tin oxide ($In_2O_3/SnO_2$ or ITO), lanthanum manganite ($LaMnO_3$) or a combination thereof.

In some embodiments, the filler material comprises conductive particles. In some embodiments, the conductive particles comprise titanium dioxide ($TiO_2$), silicon dioxide ($SiO_2$), zirconium dioxide ($ZrO_2$), aluminum oxide ($Al_2O_3$), indium tin oxide ($In_2O_3/SnO_2$ or ITO), lanthanum manganite ($LaMnO_3$) or a combination thereof.

In some embodiments, the filler material comprises conductive particles or non-conductive particles. In some embodiments, the conductive particles or non-conductive particles comprise titanium dioxide ($TiO_2$), silicon dioxide ($SiO_2$), zirconium dioxide ($ZrO_2$), aluminum oxide ($Al_2O_3$), indium tin oxide ($In_2O_3/SnO_2$ or ITO), lanthanum manganite ($LaMnO_3$) or a combination thereof.

In some embodiments, the filler material comprises lithium sulfide-based particles. For example, in certain embodiments, lithium sulfide-based particles comprise $Li_{10}GeP_2S_{12}$, $(1-y)Li_2S_yP_2S_5$ wherein $0.3>y>0.2$, or a combination thereof.

In some embodiments, the filler material comprises lithium oxide-based particles. In some more specific embodiments, lithium oxide-based particles further comprise lanthanum, titanium, oxygen, niobium, tantalum, calcium, strontium, barium, indium, zirconium, tellurium or combinations thereof. In certain related embodiments, the lithium oxide-based particles comprise lithium lanthanum titanium oxide, lithium lanthanum niobium oxide, lithium lanthanum tantalum oxide, lithium lanthanum zirconium oxide, $Li_6ALa_2M_2O_{12}$, $Li_{5.5}La_3M_{1.75}B_{0.25}O_{12}$, $Li_{7.06}X_3Y_{0.06}Zr_{1.94}O_{12}$, $Li_{6.5}La_3Zr_{1.75}Te_{0.25}O_{12}$, or combinations thereof wherein A is calcium, strontium, M is niobium or tantalum, barium, and X is lanthanum, niobium, tantalum.

In some embodiments, the filler material comprises lithium phosphate-based particles. In more specific embodiments, the lithium phosphate-based particles further comprise aluminum, germanium, phosphorus, oxygen, titanium, chromium, gallium, iron, scandium, indium, lutetium, yttrium, lanthanum, or combinations thereof. In more specific embodiments, the lithium phosphate-based particles comprise lithium aluminum germanium phosphate, lithium aluminum titanium phosphate, $Li_{1+x}M_xTi_{2-x}(PO_4)_3$, or combinations thereof, wherein x is less than 2 and M is Cr, Ga, Fe, Sc, In, Lu, Y or La, or combinations thereof.

In certain specific embodiments, the filler material comprises $ZrO_2$. In some embodiments, the filler material comprises $TiO_2$. In certain specific embodiments, the filler material is $ZrO_2$. In some embodiments, the filler material is $TiO_2$.

The weight percentage (i.e., concentration) of the filler material is important for imparting desirable characteristics unto the electrolyte material. The concentration of the filler material can be selected to affect the final characteristics of the solid electrolyte material based on the needs of a particular application. In some embodiments, the concentration of the filler material is greater than about 0 wt % of the solid electrolyte material. In some embodiments, the concentration of the filler material is less than about 100 wt % of the solid electrolyte material.

In certain embodiments, the concentration of the filler material ranges from about 0.1 wt % to about 40 wt % of the solid electrolyte material. In some other embodiments, the concentration of the filler material ranges from about 0.25 wt % to about 35 wt % of the solid electrolyte material. In some more specific embodiments, the concentration of the filler material ranges from about 0.5 wt % to about 30 wt % of the solid electrolyte material.

In some embodiments, the concentration of the filler material ranges from about 0.25 wt % to about 30 wt %, from about 0.25 wt % to about 25 wt %, from about 0.25 wt % to about 20 wt %, from about 0.25 wt % to about 15 wt %, from about 0.25 wt % to about 10 wt %, from about 0.25 wt % to about 5 wt %, from about 0.25 wt % to about 2.5 wt %, from about 0.25 wt % to about 40 wt %, from about 0.1 wt % to about 40 wt %, from about 1 wt % to about 40 wt %, from about 5 wt % to about 40 wt %, from about 10 wt % to about 40 wt %, from about 15 wt % to about 40 wt %, from about 20 wt % to about 40 wt %, from about 25 wt % to about 40 wt %, from about 30 wt % to about 40 wt % of from about 35 wt % to about 40 wt % of the solid electrolyte material.

5. Cross-Linking Initiator

Initiation of cross-linking between polymer compounds is typically the result of radical initiation. For example, radical initiation can be accomplished by a reacting cross-linking initiator with a suitable polymer compound in the presence of UV light. In some embodiments, the cross-linking initiator comprises a phenyl moiety.

In some embodiments, the cross-linking initiator is a UV initiator. Representative cross-linking initiators include, but are not limited to, 1-hydroxyl-phenyl-ketone, benzophenone, 2-hydroxyl-2-methyl-1-phenyl-propanone, 2-hydroxyl-1-[4-(2-hydroxy)phenyl]-2-methyl-1-propanone, methylbenzoylformate, oxy-phenyl-acetic acid 2-[2-oxo-2-phenyl-acetoxy-ethoxy]-ethyl ester, oxy-phenyl-acetic 2-[2-hydroxy-ethoxy]-ethyl ester, α,α-dimethoxy-α-phenyl-acetophenone, 2-benzyl-2-(dimethylamino)-1-[4-(4-morpholinyl)phenyl]-1-propanone, diphenyl(2,4,6-trimethyl-thio)phenyl)-phosphine oxide, phosphine oxide, phenyl bis (2,4,6-trimethyl benzoyl), 2-Hydroxy-2-methyl-propiophenone, bis(eta 5-2,4-cyclopentadien-1-yl) bis[2,6-difluoro-3-(1H-pyrrol-1-yl)phenyl]titanium, iodonium (4-methylphenyl)-[4-(2-methylpropyl)phenyl]-hexafluorophosphate, or a mixture of two or more of the foregoing cross-linking initiators.

In some more specific embodiments, the cross-linking initiator comprises acetophenone, 4'-ethoxyacetophenone, 4'-phenoxyacetophenone, benzophenone, benzoin ethyl ether, benzoin methyl ether, 4,4'-dimethoxybenzoin, 4,4'-dimethylbenzil, 2,4-diethyl-9H-thioxanthen-9-one, thioxanthen-9-one, 4-benzoylbiphenyl, 4-methylbenzophenone, methyl benzoylformate, or combinations thereof.

Those of skill in the art will appreciate that cross-linking can also be accomplished by thermal initiation. For example, in some embodiments of the methods and compositions described herein, the cross-linking initiator is a thermal initiator. In certain related embodiments, the thermal initiator includes, but is not limited to, an azo compound, a peroxide compound, bis-maleimide, or a mixture of any two or more such thermal initiators. One example of an azo compound is azoisobutyronitrile. One example of a peroxide compound is benzoyl peroxide.

In certain embodiments, the concentration of the cross-linking initiator ranges from about 5 wt % to about 55 wt % of the electrolyte material. In some other embodiments, the concentration of the cross-linking initiator ranges from about 5 wt % to about 35 wt % of the electrolyte material. In some more specific embodiments, the concentration of the cross-linking initiator ranges from about 10 wt % to about 30 wt % of the electrolyte material.

In some embodiments, the concentration of the cross-linking initiator ranges from about 0.25 wt % to about 30 wt %, from about 0.25 wt % to about 25 wt %, from about 0.25 wt % to about 20 wt %, from about 0.25 wt % to about 15 wt %, from about 0.25 wt % to about 10 wt %, from about 0.25 wt % to about 5 wt %, from about 0.25 wt % to about 2.5 wt %, from about 0.25 wt % to about 40 wt %, from about 0.1 wt % to about 40 wt %, from about 1 wt % to about 40 wt %, from about 5 wt % to about 40 wt %, from about 10 wt % to about 40 wt %, from about 15 wt % to about 40 wt %, from about 20 wt % to about 40 wt %, from about 25 wt % to about 40 wt %, from about 30 wt % to about 40 wt % of from about 35 wt % to about 40 wt % of the electrolyte material.

Devices Comprising the Electrolyte Materials

Figure 2:
FIG. 2 shows a representative solid electrolyte material as an elastic film.

The solid electrolytes of the present disclosure provide more mechanical strength than previously known solid electrolyte compositions. Additionally, they provide a commercially feasible composition with good ionic conductivity at desirable temperatures (e.g., room temperature and below). Embodiments of the solid electrolyte compositions disclosed herein can be manufactured in as an elastic film (see, e.g., FIG. 2) having robust mechanical stability, provide good ionic conductivity and excellent flexibility in terms of design options. A particular advantage of the solid electrolyte compositions of the disclosure is chemical and mechanical stability (e.g., suppression of dendrite growth), which prevents short circuiting of cells and causes overheating and thermal runaway.

Lithium batteries constructed from the solid electrolyte compositions provide clean and sustainable energy storage systems. By contrast, a conventional liquid-based electrolyte battery are thermally and electrochemically unstable (e.g., flammable at high temperatures). The solid electrolyte compositions of the present disclosure can provide stable, cost-effective, and highly efficient all solid-state lithium batteries. New lithium batteries made with the solid electrolyte material according to certain embodiments of this disclosure offer many advantages over conventional lithium batteries utilizing other known solid electrolytes, including improved energy density, power density, higher capacity utilization, higher cycle life, greater charge-discharge efficiencies, wider operating temperature range, and greater safety and reliability (e.g., minimization of thermal runaway).

Additionally, lithium batteries comprising the solid electrolyte materials of the present disclosure can be produced safely at a lower cost than alternative solid state electrolyte-based lithium batteries (e.g. ceramic electrolytes). The solid electrolyte compositions disclosed herein can be used in a variety of different applications. Specifically, the electrolyte composition of the present disclosure can be modified to generate a non-flammable liquid electrolyte. Such non-flammable liquid electrolyte can replace the conventional organic liquid electrolyte, providing an immediate and safer alternative for existing lithium battery fabrication process.

Electrochemical Cells

An electrochemical cell comprising a solid electrolyte material according to the present disclosure generally has a non-reactive outer shell or container that encloses the electrodes and electrolyte materials of the cell. The container may be made of any conventional electrochemical storage cell material, such as a durable plastic, hard rubber or a non-reactive metal such as stainless steel. When metal is used as the container, an optional insulating lining may also be included.

One particular embodiment provides an electrochemical cell comprising:

(a) a solid electrolyte material comprising a solid electrolyte material according to any one of the foregoing embodiments;
(b) a cathode; and
(c) an anode.

In some embodiments, the electrochemical cell further comprises a separator.

The electrodes may be position on the sidewalls of the container along with a corresponding electrode current collector. The current collectors (i.e., a negative current collector and a positive current collector, respectively) can be made of any suitable material, including a non-reactive metal sheet or mesh, e.g., a nickel, copper, or stainless steel material.

Certain related embodiments provide an electrochemical storage device (e.g., a battery) comprising a plurality of electrochemical cells according to the foregoing embodiments. In some embodiments, the electrochemical cells are connected in parallel. In some other embodiments, the electrochemical cells are connected in series. In certain embodiments, the electrical energy storage device further comprises an outer structure which is electrically insulating (e.g., plastic, rubber, metal or combinations thereof).

The electrochemical storage devices of the present disclosure can be used in a variety of different applications. For example, embodiments of the electrochemical storage device may be used in mobile phones, smart phones, laptops, tablets, digital cameras, camcorders, electronic cigarettes, handheld game consoles, flashlights and power tools (e.g., cordless drills, sanders, saws, hedge trimmers and the like). In certain embodiments, the electrochemical storage device may be used in electric vehicles, including electric automobiles, hybrid automobiles, electric bicycles, personal transporters, electric wheelchairs, remote controlled vehicles (e.g., cars, trucks, aircraft, boats).

Related embodiments provide a method for storing or distributing electrochemical energy, the method comprising:

(a) providing a device comprising the electrochemical cell of embodiments disclosed herein;
(b) applying a voltage to the electrochemical cell; and
(c) flowing ions through the electrolyte material of the electrochemical cell.

In some more specific embodiments, the flowing is from the anode toward the cathode. In other embodiments, the flowing is from the cathode toward the anode.

Also provided in one embodiment is method for preparing a solid electrolyte material, the method comprising mixing a polymer compound, a lithium salt, a plasticizer, a filler material, and a cross-linking initiator to obtain a mixture, wherein the lithium salt is dispersed within the polymer compound and initiating a cross-linking reaction, thereby converting the polymer compound to a solid, cross-linked polymer compound.

In some embodiments, the initiating comprises exposing the mixture to ultra-violet radiation. In some embodiments, the method further comprises dispersing the mixture onto a substrate before the initiating. In some specific embodiments, the method further comprises hot-pressing the mixture before the initiating. In some of the foregoing embodiments, the method further comprises drying the mixture before the initiating. In some of the foregoing embodiments, the mixing further comprises adding solvent (e.g., an organic solvent or an aqueous solvent).

In one embodiment, the solid electrolyte material is formed into a conductive film. For example, the conductive film may be deposited to a surface under vacuum using any of a variety of methods (e.g., evaporation, sputtering) as are known in the art. In one embodiment, the conductive film is cast onto one side of metal substrate. In one embodiment, the conductive film has a thickness ranging from about 15 μm to about 75 μm. In another embodiment, the conductive film has a thickness ranging from about 10 μm to about 150 μm. In another embodiment, the conductive film has a thickness less than about 75 μm. In another embodiment, the conductive film has a thickness less than about 50 μm. In another embodiment, the conductive film has a thickness of about 25 μm. In some embodiments, the conductive film has a thickness ranging from about 5 μm to about 200 μm, from about 10 μm to about 200 μm, from about 5 μm to about 175 μm, from about 10 μm to about 175 μm, from about 5 μm to about 50 μm, from about 10 μm to about 50 μm, from about 10 μm to about 50 μm, from about 25 μm to about 50 μm.

EXAMPLES

The electrolyte materials disclosed in the following Examples were prepared according to the methods disclosed herein as well as methods known in the art. For example, solid electrolyte materials and related electrochemical cells and storage devices can be prepared using methods disclosed in PCT Pub. No. WO 2016/196873; and WO 2001/017051 and US Pub. No. 2017/0179545; 2017/0141430; 2017/0194663; 2015/0221980 and 2011/0003211 each of which is hereby incorporated by reference in its entirety.

Chemicals were obtained from commercial sources at reagent grade purity or better and were used as received from the supplier without further purification.

Example 1

Synthesis of Electrolyte Material

A polymer compound, lithium salt, plasticizer, fillers, and a cross-linking initiator are added to a reaction vessel in a desired ratio. Solvent is optionally added to the other components. The resulting reaction mixture is blended to form a homogeneous solution that is cast onto a substrate. After casting, the composition is hot-pressed and dried. The final hot-pressed and dried composition is cured with UV exposure for at least 5 minutes up to 2 hours to obtain a solid electrolyte material.

Example 2

Comparison of Electrolyte Material

Data showing ionic conductivity of exemplary embodiments of electrolyte material of the present disclosure and other reported electrolyte materials is shown in Table 1. The data show ionic conductivity of Electrolytes 1 and 2 are about one order of magnitude higher than electrolytes containing other composition, suggesting a significant improvement over other representative solid electrolyte compositions.

Additionally, FIG. 1 shows the cycle-life data for symmetric cell made with an exemplary electrolyte material of the present disclosure. The data show that there is no sign of short-circuiting over the course of 300 cycles at 0.1 mA $cm^{-2}$. Applicant has unexpectedly discovered that the present electrolyte materials are remarkably mechanically robust as a solid polymer electrolyte operating at room temperature.

TABLE 1

Comparison of ionic conductivity

| Composition | Polymer | Li salt | Plasticizer | Filler Material | Cross-linking initiator | σ at 25° C. (mS/cm) |
|---|---|---|---|---|---|---|
| Electrolyte A | PEO[a] | LiTFSI[b] | — | — | — | 0.00001-0.0062 |
| Electrolyte B | PS-PEO | LiTFSI | — | — | — | 0.1 |
| Electrolyte C | PEO | LiClO$_4$[c] | — | TiO$_2$ | — | 0.02-0.14 |
| Electrolyte D | PEO | LiClO$_4$ | — | Al$_2$O$_3$ | — | 0.01 |
| Electrolyte E | Cross-linked PE/PEO | LiTFSI | TEGDME[d] | — | — | 0.2 |
| Electrolyte F | PEO | LiTFSI | SN[e] | Li$_{10}$GeP$_2$S$_{12}$ | — | 0.091 |
| Electrolyte G | PEO | LiTFSI | TEGDME | — | 4-MBP[f] | 0.2 |
| Electrolyte 1 | PEO | LiTFSI | TEGDME | ZrO$_2$ | 4-MBP | 0.85 |
| Electrolyte 2 | PEO | LiTFSI | TEGDME | TiO$_2$ | 4-MBP | 3.72 |

[a]Poly(ethylene oxide)
[b]Lithium bistrifluoromethane sulfonamide
[c]Lithium perchlorate
[d]Tetraethylene glycol dimethyl ether
[e]Succinonitrile
[f]4-Methylbenzophenone Example 3

Concentration Comparison

Figure 3:
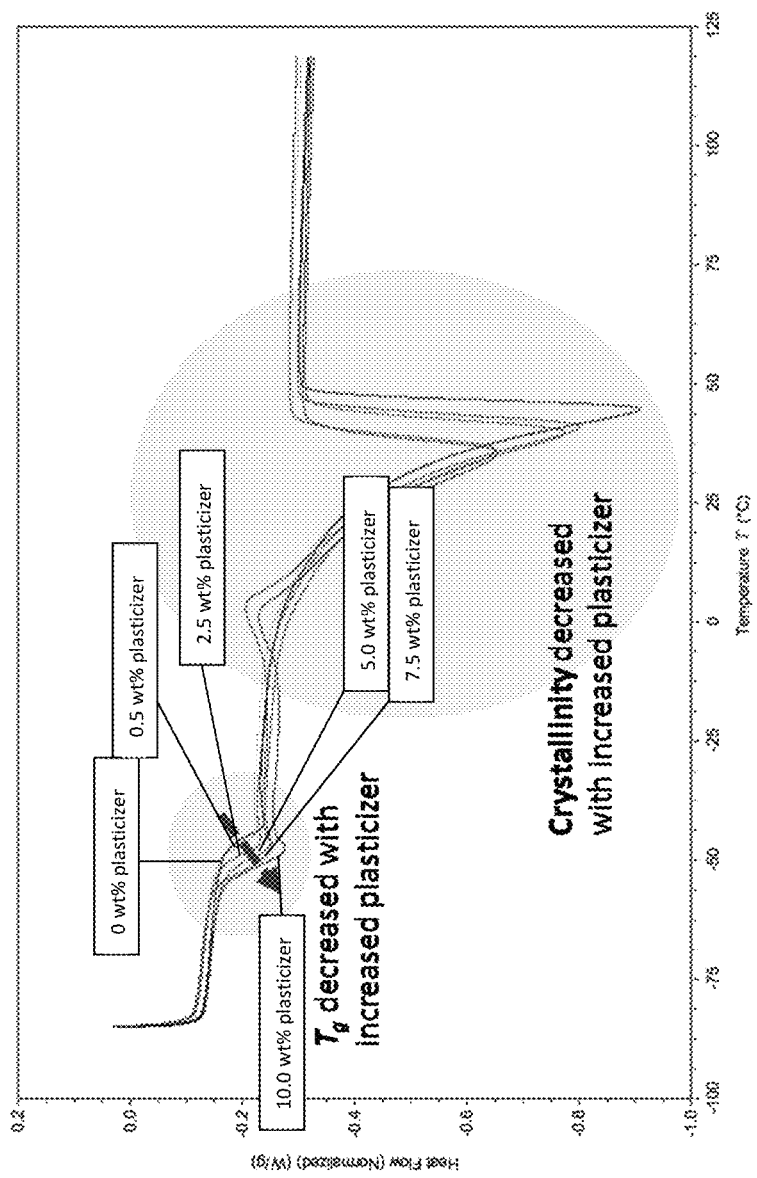
FIG. 3 shows DSC data denoting crystalline properties for solid electrolyte materials having various component mixtures.

Differential scanning calorimetry analysis was used to evaluate the effect of concentration of the different components. A ramp rate of 10° C./minute was used and the data show a decrease in the glass transition temperature ($T_g$) as the concentration of plasticizer increases, in which the various concentration of plasticizer is denoted by different color (black=0 wt %, yellow=0.5 wt %, green=2.5 wt %, purple=5 wt %, red=7.5 wt %, and blue=10 wt %). Additionally, the crystallinity of the composition decreases as the concentration of plasticizer is increased (see FIG. 3).

Example 4

AC Impedance Test and Ionic Conductivity

Figure 4:
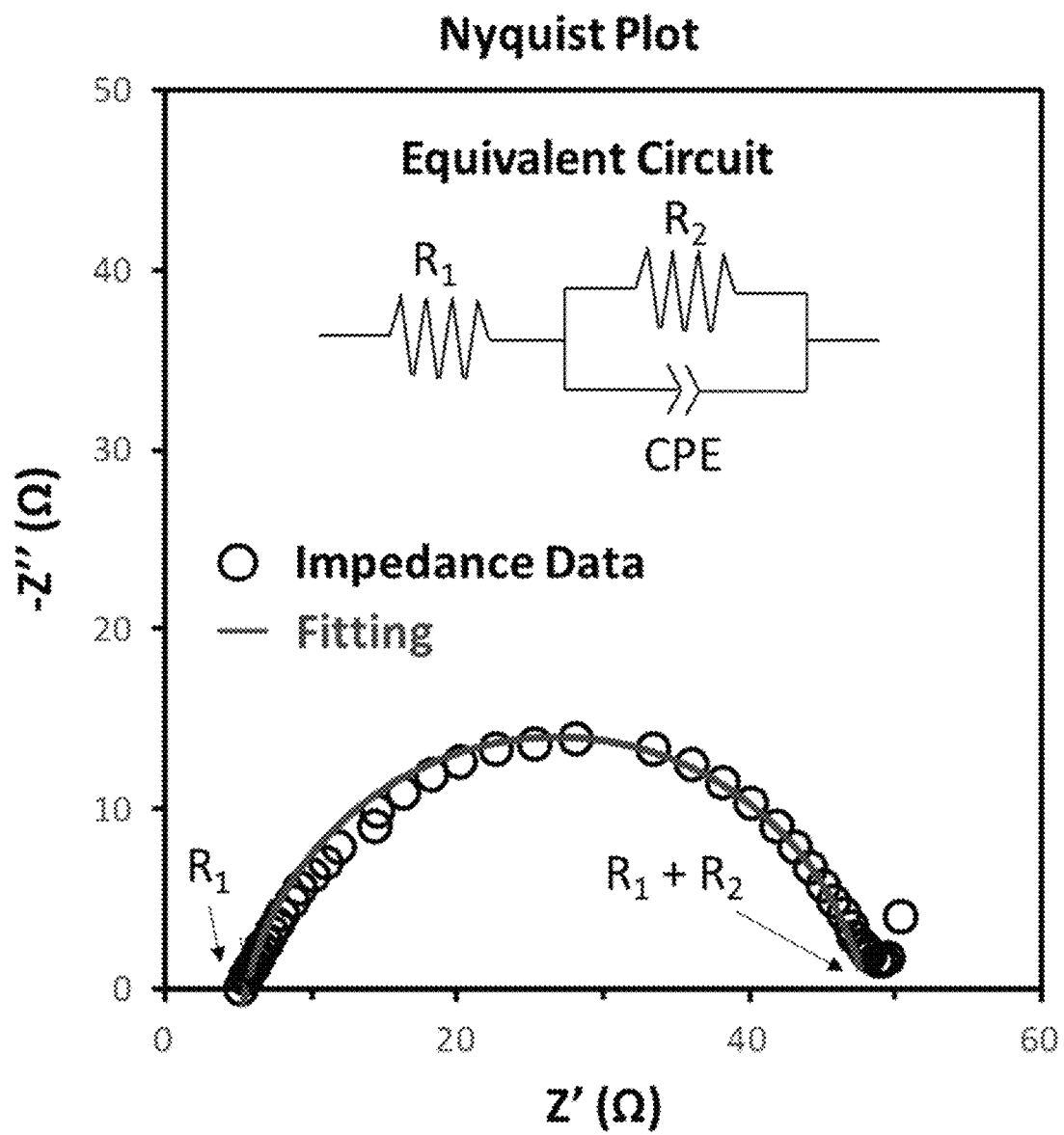
FIG. 4 shows a Nyquist plot of impedance for a solid electrolyte material.

Impedance data was collected and plotted (FIG. 4). The test polymer electrolyte specimens were sandwiched between two aluminum foil electrodes in the glove box. Polymer samples were pre-annealed at 80° C. overnight before test. The AC frequency range and voltage amplitude were 100 Hz-1 MHz and 10 mV, respectively. The resistance ($R_1+R_2$) was determined from the touchdown point in Nyquist plots as shown in FIG. 4. The ionic conductivity is calculated according to the following equation:

$$\sigma = \frac{\text{Electrolyte Thickness}}{(R_1 + R_2) \cdot \text{Area}}$$

The ionic conductivity of a representative solid electrolyte material as disclosed herein (i.e., Electrolyte 2) was measured and compared to various other electrolyte compositions. As the data from Table 1 show, the conductivity for Electrolyte 2 is greater than 3 mS/cm at room temperature which is significantly more than all of the other electrolyte compositions tested (i.e., Electrolyte A-G).

Example 5

Galvanostatic Charging/Discharging Test

A symmetric lithium cell was prepared based on a representative solid electrolyte material according to embodiments of the present disclosure. Voltage was cycled through the cell at a current density of 0.1 mA/cm$^2$. As the data in FIG. 1 show, the cell is able to withstand more than 300 charge/discharge cycles.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A solid electrolyte material comprising:
   a cross-linking initiator selected from 4-methyl benzophenone, 2-Hydroxy-2-methylpropiophenone, and 2,4-diethyl-9H-thioxanthen-9-one;
   a cross-linked poly(ethylene) oxide present in an amount ranging from about 25% to about 65% by weight of the solid electrolyte material;
   lithium bis-trifluoromethane sulfonylimide dispersed within the cross-linked poly(ethylene oxide) and present in an amount ranging from about 0.5% to about 20% by weight of the solid electrolyte material;
   tetraethylene glycol dimethyl ether present in an amount ranging from about 15% to about 65% by weight of the solid electrolyte material;
   indium tin oxide present in an amount ranging from about 0.5% to about 30% by weight of the solid electrolyte material; and
   wherein the solid electrolyte material is in the form of an elastic film.

2. The solid electrolyte of claim 1, wherein the solid electrolyte material further comprises an additional polymer compound selected from the group consisting of poly(m- ethyl methacrylate), poly(ethylene oxide)methylether methacrylate, poly(acetyl-oligo(ethylene oxide) acrylate), poly(ethylene glycol)dimethacrylate, poly(ethylene glycol) methacrylate, poly(acrylonitrile), poly(vinyl chloride), poly(styrene-b-ethylene oxide), poly(styrene-b-ethylene oxide) methyl ether metacrylate, poly(styrene-b-methyl methacrylate), poly(ethylene-b-ethylene oxide), or combinations thereof.

3. The solid electrolyte material of claim 1, comprising lithium perchlorate, lithium trifluoromethanesulfonate, or a combination thereof.

4. The solid electrolyte material of claim 1, comprising succinonitrile, polysquarate, ethylene carbonate, ethylene glycol, polysorbate 80, or a combination thereof.

5. The solid electrolyte material of claim 1, comprising non-conductive particles comprising titanium dioxide silicon dioxide, zirconium dioxide, aluminum oxide, lanthanum manganite or a combination thereof or conductive particles comprising; titanium dioxide, silicon dioxide, zirconium dioxide, aluminum oxide, lanthanum manganite or a combination thereof.

6. The solid electrolyte material of claim 1, further comprising lithium sulfide-based particles, lithium oxide-based particles, lithium phosphate-based particles, or combinations thereof.

7. An electrochemical cell comprising:
(a) a solid electrolyte material according to claim 1;
(b) a cathode; and
(c) an anode.

8. An electrochemical energy storage device comprising a plurality of electrochemical cells according to claim 7.

9. A method for storing or distributing electrochemical energy, the method comprising:
(a) providing a device comprising the electrochemical cell of claim 7;
(b) applying a voltage to the electrochemical cell; and
(c) flowing ions through the electrolyte material of the electrochemical cell.

10. A method for preparing a solid electrolyte material, the method comprising:
mixing poly(ethylene) oxide, lithium bis-trifluoromethane sulfonylimide, tetraethylene glycol dimethyl ether, indium tin oxide, and a cross-linking initiator to obtain a mixture, wherein the lithium bis-trifluoromethane sulfonylimide is dispersed within the poly(ethylene) oxide;
drying the mixture; and
after drying the mixture, initiating a cross-linking reaction, thereby forming the solid electrolyte material;
wherein the solid electrolyte material comprises:
cross-linked poly(ethylene) oxide present in an amount ranging from about 25% to about 65% by weight of the solid electrolyte material;
lithium bis-trifluoromethane sulfonylimide dispersed within the cross-linked poly(ethylene oxide) and present in an amount ranging from about 0.5% to about 20% by weight of the solid electrolyte material;
tetraethylene glycol dimethyl ether present in an amount ranging from greater than 0% to about 10% by weight of the solid electrolyte material;
indium tin oxide present in an amount ranging from about 0.5% to about 30% by weight of the solid electrolyte material; and
wherein the solid electrolyte material is in the form of an elastic film.

11. The solid electrolyte material of claim 1, wherein the solid electrolyte material has an ionic conductivity ranging about $10^{-4}$ S/cm to about $10^{-2}$ S/cm and a degree of crystallinity of less than about 70%.

12. The solid electrolyte material of claim 1, wherein the solid electrolyte material has an ionic conductivity above about $10^{-3}$ S/cm and a degree of crystallinity of less than about 90%.

13. The solid electrolyte material of claim 1, wherein the cross-linking initiator is present in an amount ranging from about 0.25% to about 10% by weight of the solid electrolyte material.

14. The method of claim 10, wherein the cross-linking initiator is selected from 4-methyl benzophenone, 2-Hydroxy-2-methylpropiophenone, and 2,4-diethyl-9H-thioxanthen-9-one.

15. A solid electrolyte material comprising:
a cross-linked poly(ethylene) oxide present in an amount ranging from about 25% to about 65% by weight of the solid electrolyte material;
a polymer selected from the group consisting of poly(methyl methacrylate), poly(ethylene oxide)methylether methacrylate, poly(acetyl-oligo(ethylene oxide) acrylate), poly(ethylene glycol)dimethacrylate, poly(ethylene glycol) methacrylate, poly(acrylonitrile), poly(vinyl chloride), poly(styrene-b-ethylene oxide), poly(styrene-b-ethylene oxide)methyl ether metacrylate, poly(styrene-b-methyl methacrylate), poly(ethylene-b-ethylene oxide), or combinations thereof;
lithium bis-trifluoromethane sulfonylimide dispersed within the cross-linked poly(ethylene oxide) and present in an amount ranging from about 0.5% to about 20% by weight of the solid electrolyte material;
tetraethylene glycol dimethyl ether present in an amount ranging from about 15% to about 65% by weight of the solid electrolyte material;
indium tin oxide present in an amount ranging from about 0.5% to about 30% by weight of the solid electrolyte material; and
wherein the solid electrolyte material is in the form of an elastic film.

16. The solid electrolyte material of claim 15, comprising lithium perchlorate, lithium trifluoromethanesulfonate, or a combination thereof.

17. The solid electrolyte material of claim 15, comprising succinonitrile, polysquarate, ethylene carbonate, ethylene glycol, polysorbate 80, or a combination thereof.

18. The solid electrolyte material of claim 15, comprising non-conductive particles comprising titanium dioxide silicon dioxide, zirconium dioxide, aluminum oxide, lanthanum manganite or a combination thereof or conductive particles comprising; titanium dioxide, silicon dioxide, zirconium dioxide, aluminum oxide, lanthanum manganite or a combination thereof.

19. The solid electrolyte material of claim 15, further comprising lithium sulfide-based particles, lithium oxide-based particles, lithium phosphate-based particles, or combinations thereof.

20. An electrochemical cell comprising:
(a) a solid electrolyte material according to claim 15;
(b) a cathode; and
(c) an anode.

* * * * *